Patented Sept. 8, 1953

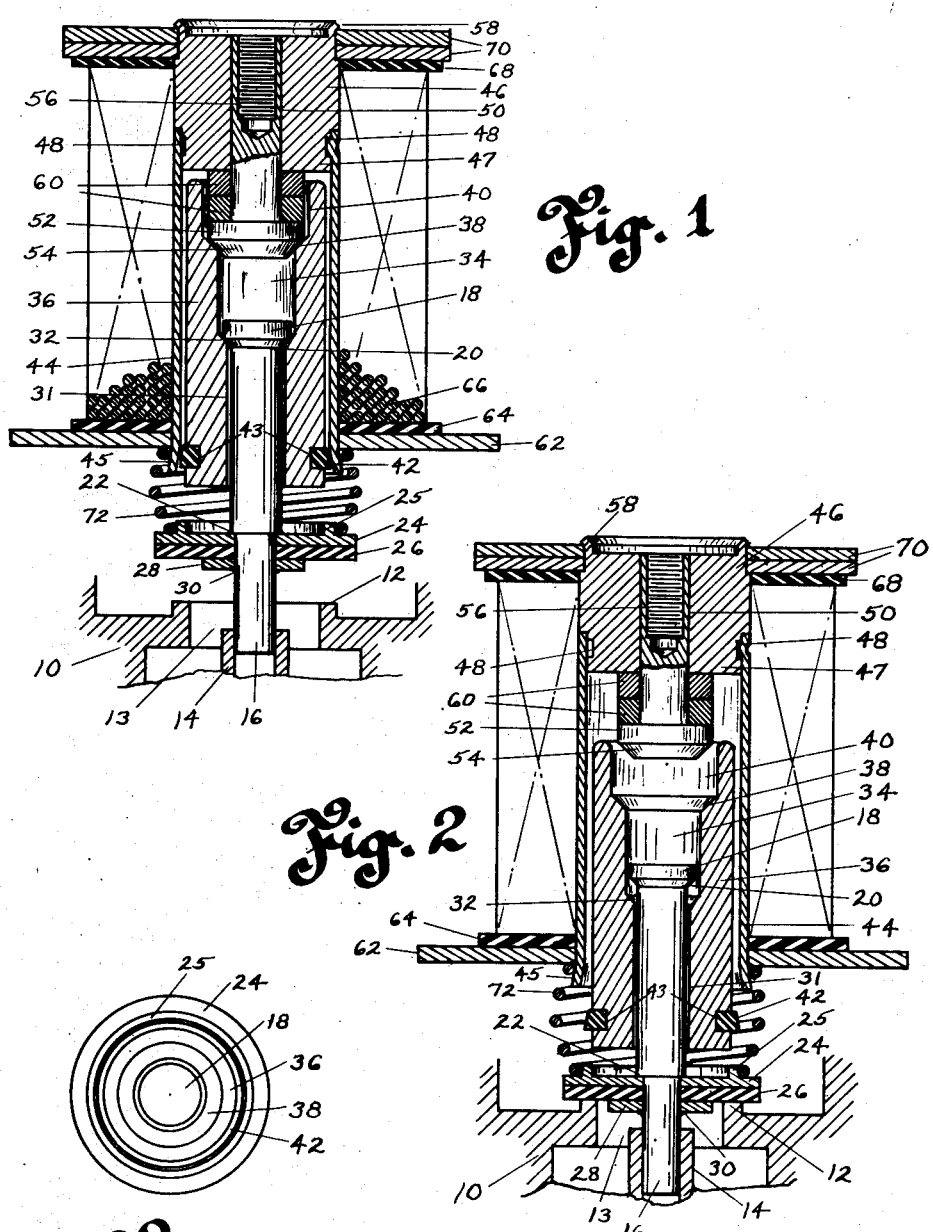

2,651,744

UNITED STATES PATENT OFFICE 2,651,744

CONTROL DEVICE

Gordon R. Acklin, Melvin Hantack, and Huel E. Perrey, St. Louis, Mo., assignors to McQuay-Norris Manufacturing Company, St. Louis, Mo., a corporation of Delaware Application February 2, 1949, Serial No. 74,226

8 Claims. (Cl. 317—191)

This invention relates to improvements in control devices. More particularly, this invention relates to improvements in solenoids that can be used to actuate control devices.

It is therefore an object of the present invention to provide an improved solenoid that can be used to actuate control devices.

In the construction and operation of control devices, it is often desirable to employ solenoids as actuators. In some cases the solenoids can be operated on direct current; but the ever-increasing use of alternating current means that many solenoids must be made to operate on alternating current. Where direct current is used to energize the solenoids, the magnetic flux lines generated by the solenoids are unidirectional and they do not need to pass through a zero value during energization of the solenoids; consequently, the movable cores of direct current solenoids are held in energized position by a continuous and steady force. However, where alternating current is used to energize the solenoids, the magnetic flux lines generated by the solenoids are inconstant and they repeatedly reverse direction, thereby tending to pass through the zero value; consequently the movable cores of alternating current solenoids are held in energized position by variable and inconstant forces. The result is that the movable cores of alternating current solenoids tend to experience oscillations of small amplitude but sizable frequency whenever they are in energized position; and these oscillations cause noisy operation of the solenoids.

Various attempts have been made to reduce the noise experienced in the operation of solenoids that are energized with alternating current; and most of those attempts have been predicted upon two principal theories of operation. The first of these two theories of operation contemplates the use of a centering surface on one end of the movable core to engage and be centered by a complementary stationary surface, and it also contemplates the use of a close-fitting sleeve to hold and center the other end of the movable core. By keeping the axis of the movable core precisely coincident with the axis of the solenoid coil, the stationary sleeve and the stationary centering surface were supposed to avoid transverse movement of the core and thereby prevent all oscillation of the core. However, before solenoids based upon this theory could operate as intended, the stationary sleeves would have to be made with great precision so they would not hold the cores against retracting movement and yet would prevent oscillation of those cores. In addition, the sleeves would have to be aligned precisely with the stationary centering surfaces lest they bind and clamp the cores in energized position. If the sleeves and stationary centering surfaces of the solenoids could be made individually and could be made with great care and precision, and if they could be positioned in the solenoid casings with equal care and precision, the solenoids could operate satisfactorily until wearing of the sleeves caused excessive noise; but the required care and precision cannot be assured with large scale production. Consequently, solenoids based upon the first of these two theories of operation are noisy in operation.

The second of these two theories of operation contemplates the use of a centering surface at the upper end of the movable core to engage a stationary centering surface; and it also contemplates the use of a guiding surface that engages the lower end of the core, immediately prior to the engagement of the upper end of the core with the stationary centering surface, to force the axis of the core into coincidence with the axis of the solenoid coil. Here again, it was sought to avoid oscillations of the core by placing the axes of the solenoid and the solenoid coil in coincidence; and here again if solenoids could be made individually and could be made with great care and precision they could work. However, factory methods cannot assure the attainment, in every instance, of just the right depth of cut, just the right thickness of electro-plated metal on the mating surfaces, and just the exact spacing and alignment of the centering surfaces.

Factory methods necessarily lead to slight variations known as manufacturing tolerances; and those variations make it impossible to attain the precision required in making solenoids embodying these two theories of operation. Moreover, the guiding surfaces, for the lower ends of cores embodying the second theory of operation, tend to wear at excessive rates because the cores are unguided until a fraction of a second before they strike the guiding surfaces and are forced into alignment; consequently the guiding surfaces for the lower ends of the core must suddenly engage rapidly moving objects and force them into centered position. This quickly wears the engaging faces of the guiding surfaces. Consequently while theoretically operable, solenoids based upon these theories of operation are subject to practical objections. The present invention obviates these objections and attains quiet operation by providing a solenoid which utilizes a new theory of operation. The solenoid contemplated by the present invention has a movable core which is permitted to move either concentrically or eccentrically relative to the solenoid coil; and that solenoid cushions any oscillations of its core by a resilient collar or ring and thereby prevents noise. Such a solenoid does not require precise and exact machining or assembling; instead it can easily be made by factory methods and thus can be made at low cost. It is therefore an object of the present invention to provide a solenoid wherein the movable core is permitted to move concentrically or eccentrically relative to the coil, and wherein any oscillations of the core are cushioned by a resilient collar or ring.

The movable core of the solenoid provided by the present invention carries a valve stem which can move axially of the core. The upper end of the stem will selectively engage a seat which is provided on the interior of the core at a point about midway of the length of the core, the shank of the stem will extend through an axial passage in the lower end of the core, and the lower end of the stem will be disposed below the lower end of the core. A spring will bias the valve stem downwardly toward a valve seat; and as the core moves upwardly when it is energized, the seat on the interior of the core will engage the upper end of the valve stem and move that stem up and away from the valve seat. The magnetically-induced, upwardly-directed forces on the core will be strongest in the upper end of the core, and the spring-induced, downwardly-directed force on the core will be applied adjacent the center of the core; and the conjoint effect of those two oppositely-directed forces at spaced points on the core will be to provide an initial alignment of the core as it starts to move upwardly. This alignment is not positive in character since the valve stem fits loosely within the core and since the spring can bend transversely of that stem. Moreover, the alignment is not maintained as the core continues its upper movement because the effective point of application of the magnetic forces on the core will move closer and closer to the point where the valve stem seats in the core. However, the initial alignment does direct the core along a path generally parallel to the axis of the solenoid coil. As the core continues to move upward, it will largely follow its initial direction because of its inertia and because any tilting of the core will be limited by engagement between the lower end of the core and the shank of the valve stem. When the core reaches the upper limit of its travel, a centering surface on its upper end will engage a stationary centering surface; and the engagement of these surfaces will hold the upper end of the core on the axis of the solenoid coil and will largely hold the rest of the core against transverse movement. While the core may be concentric or eccentric relative to the axis of the solenoid coil, any eccentricity will be small enough to avoid excessive oscillation of the core; and as a result the core will be quiet when the solenoid core is energized. It is therefore an object of the present invention to provide a solenoid wherein the coil is loosely guided during its initial movement but is finally held and centered solely by its upper end.

The seating of the upper end of the valve stem approximately midway of the length of the core enables the upper end of that stem to act as a fulcrum for the core. As the core telescopes into the solenoid coil, the magnetic flux lines will exert ever-increasing aligning forces on the core; and since the stem seats midway of the core, the core will be able to tilt and shift somewhat and thereby align itself with the axis of the solenoid coil. Excessive tilting of the core will be prevented by engagement between the lower end of the core and the shank of the stem, but sufficient tilting can be attained to provide the desired coincidence of the axes of core and coil. It is therefore an object of the present invention to provide a valve stem that seats approximately midway of the core of a solenoid and acts as a fulcrum for that core.

To further avoid noise, the solenoid coil is provided with a passage considerably larger than the core, and a ring of yielding material is provided on the exterior of the core. This ring has a diameter smaller than the diameter of the passage through the solenoid coil, but it has a diameter enabling it to project outwardly beyond the surface of the core. The large diameter of the passage in the solenoid coil minimizes the likelihood of the core engaging and oscillating against that passage, and the ring of yielding material absolutely prevents metal-to-metal contact between the sides of the core and the passage in the solenoid coil. This arrangement not only eliminates the need for precise machining, plating, and aligning of the parts, but also avoids metal-to-metal contact between the core and the passage in the solenoid coil. It is therefore an object of the present invention to provide a core that fits loosely within the passage in a solenoid coil and has a yielding ring that prevents metal-to-metal engagement with that passage.

When the core seats against the stationary centering surface, the downward force exerted by the stem will be insignificant compared to the upwardly directed magnetic force on the core; because the force exerted by a spring increases linearly while the force exerted by a magnet increases inversely as the square of the distance. Thus when the core has moved upwardly, compressing the spring acting on the stem and closing the air gap in the flux path for the solenoid coil, the magnetic force on the core will greatly overbalance the force of the spring. This assures solid seating of the core against its centering surface. At the same time however, the spring will be able to overcome the force due to residual magnetism and free the core when the solenoid coil is deenergized. In this way the one spring can perform the treble functions of seating the valve stem, helping the valve stem provide an initial guiding action, and overcoming the residual magnetism in the solenoid coil.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and do not limit the invention and that the invention will be defined by the appended claims.

In the drawing—

Fig. 1 is a broken-away, cross-sectional, side view of a solenoid and casing made in accordance with the principles and teachings of the present invention, and it shows the solenoid core in energized position, Fig. 2 is a broken-away, cross-sectional, side view of the solenoid and casing shown in Fig. 1, and it shows the valve in closed position and the solenoid core moving to its de-energized position, and Fig. 3 is a plan view of the solenoid core shown in Figs. 1 and 2.

Referring to the drawing in detail, the numeral 10 denotes a portion of the casing for a solenoid and for a valve operated by the solenoid. The casing 10 has a valve seat 12 which takes the form of an annular projection surrounding the passage 13 through which the valved products can flow. Suitable ports, not shown, will be provided in the casing 10 for ingress and egress of the products to be valved. A guide 14 is disposed below the valve seat 12, and it receives and guides the lower end of valve stem 16.

Valve stem 16 extends vertically upward from the valve guide 14, and it has an enlarged head 18 at the upper end thereof. The head 18 has a diameter greater than the rest of stem 16, and it has a frusto-conical surface 20 on the under side thereof. Intermediate the top and bottom of the valve stem 16 is a shoulder 22, and that shoulder holds a backing plate 24 in position on the stem 16. The backing plate 24 has an annular projection 25 on the upper surface thereof and it has a plane lower surface; the plane lower surface backing up a disc 26 of resilient material such as rubber, synthetic rubber, elastomeric plastic, or the like. A securing disc 28 bears against the under surface of the disc 26 of resilient material and it holds that disc in position against backing plate 24. The securing disc 26 is locked in position on the stem 16 by a metal bead or flange 30 that is spun or riveted out of the body of stem 16 and is pressed against the under surface of securing disc 28.

The securing disc 28 is smaller than the disc 26 of resilient material, and the outer periphery of the disc 26 is exposed. This outer periphery can bear against the annular seat 12 and halt all flow of valved products through the passage 13 of the casing 10. Lifting of the valve stem 16 will, however, raise disc 26 out of engagement with seat 12 and permit free flow of valved products through passage 13. The use of the disc 26 of flexible material is very desirable since it can deform to conform to any irregularities that are initially in, or may develop in, the surface of the seat 12.

The upper portion of the valve stem 16 extends into a bore 31 of the movable core 36 of a solenoid. The bore 31 has a larger diameter than the stem 16, and the stem 16 fits loosely within the movable core 36. The enlarged head 18 of the valve stem 16 has a diameter greater than that of bore 31, and it is disposed within a second bore 34 within the core 36. The bore 34 has a larger diameter than bore 31 and it has a frusto-conical seat 32 at the lower end thereof; the seat 32 being contiguous to both of the bores 31 and 34.

A third bore 40 is provided in the upper end of core 36, and a frusto-conical seat 38 is provided at the lower end of that bore; the seat 38 being contiguous to both the bores 34 and 40. The diameter of bore 40 is larger than that of bore 34; and the diameter of bore 31 is smallest of all. Thus the stem 16 can be telescoped through bores 40, 34 and 31 until the enlarged head 18 bears against the seat 32. In assembling the core 36 and the valve stem 16, the lower end of stem 16 is telescoped through the bores 40, 34 and 31 of core 36, the backing plate 24, disc 26 and securing disc 28 are telescoped over that lower end, and then the head or flange 30 is formed on the stem 16 to lock backing plate 24, disc 26, and securing disc 28 in position. The stem 16 is longer than bore 31 of core 36, and that stem can thus reciprocate relative to the core; but the enlarged head 18 and the backing plate 24 will limit such reciprocation and will prevent separation of the core and stem.

A ring 42 of resilient material such as rubber, synthetic rubber, elastomeric plastic, or the like is supported in a groove 43 in the lower end of the core 36; and that ring has a smaller diameter at its upper end than it has at its lower end. This ring is dimensioned so it telescopes freely into a sleeve 44 of non-magnetic material that provides a passage in a solenoid core; the inner diameter of sleeve 44 being greater than the largest diameter of ring 42. As a result the axis of core 36 can be disposed at an angle to the axis of the passage in the solenoid coil without causing ring 42 to engage sleeve 44, so long as that angle is not too large. Moreover, even if the angle between the axis of core 36 and the axis of the passage is large enough to cause the core to engage the sleeve 44, that engagement will not be a metal-to-metal contact but instead will be a rubber-to-metal contact. In addition, the taper on the ring 42 will cooperate with the flare 45 on the lower end of sleeve 44 to provide a slight adjustment in the alignment of the core and sleeve in those instances where the initial angle between the axes of core and sleeve is large.

A closure 46 of magnetic material is provided at the upper end of sleeve 44, and that closure has a portion 47 of reduced diameter which telescopes into the upper end of sleeve 44. The closure 46 can be permanently secured to the sleeve 44 as by brazing or by providing circumferentially spaced recesses 48 in the portion 47 of closure 46 and bending the upper end of sleeve 44 into those recesses. The closure 46 has a centrally disposed opening 50 therein; and that opening receives a stop 52 of magnetic material. Stop 52 has an enlarged head at the lower end thereof and it has a frusto-conical face 54 on the under side of that enlarged head. The enlarged head underlies and can support two shading rings 60 of copper as shown, or can support just one shading ring; and when the stop 52 is inserted in the opening 50 with a press fit, closure 46, stop 52 and shading rings 60 will be assembled as a unit.

A threaded recess 56 is provided in the upper end of stop 52, and that recess will receive a screw, not shown, which secures the top of the casing 10 to the body of that casing. The upper end of closure 46 is provided with a flange 58 which is malleable and can be bent outwardly.

A supporting plate 62 of magnetic material is telescoped over the sleeve 44; and that plate rests upon a portion, not shown, of the casing 10. The plate 62 has a diameter that is just large enough to receive the sleeve 44; and the flaring 45 at the lower end of sleeve 44 clamps the plate 62 onto that sleeve. A washer 64 of fiber or other non-metallic material rests on the supporting plate 62 and isolates the turns of wire 66 of the solenoid coil from that plate. Although all of the turns of wire 66 are not shown, those turns of wire form a coil disposed concentrically of the sleeve 44, as indicated schematically in Figs. 1 and 2; and the turns of wire 66 will create a magnetic field in the closure 46 and in the passage formed by sleeve 44. The flux lines of that field will also pass through the core 36 and the supporting plate 62.

A washer 68 of fiber or other insulating material is placed on top of the solenoid coil, and it is held in place by a pair of plates 70 of magnetic material. The plates 70, which are isolated from the turns 66 of the solenoid coil by washer 68, are held in place by peening the flange 58 on enclosure 46 until it is larger than the diameters of the openings in plates 70. In this way the flange 58 cooperates with the flared end 45 of sleeve 44 to position the solenoid coil relative to the sleeve 44 and to the casing.

A spring 72 of generally helical form surrounds the lower end of the core 36 and stem 16, and that spring bears against backing plate 24 and supporting plate 62. The annular projection 25 on backing plate 26 and the flared lower end 45 of sleeve 44 hold the spring 72 against undesired shifting relative to the core 36 and stem 16. The spring 72 biases the valve stem 16 and its disc 26 of resilient material toward the valve seat 12 at all times, and it provides sufficient pressure on disc 26 to enable it to deform and prevent all flow of valved products through passage 13.

In its normal condition, the solenoid will be deenergized and the disc 26 will be pressed against valve seat 12 by spring 72. At that time, the bottom of the core 36 will be resting on the top of backing plate 24; held against tilting by its engagement with backing plate 24 and by the fact that valve stem 16 extends up through the bore 31. The valve stem in turn will be held against tilting by its engagement with guide 14 and seat 12. When current is passed through the turns of wire 66 of the solenoid coil, magnetic flux lines will pass through the upper end of the core 36 and cause it to move upwardly. During a small part of its initial movement as shown in Fig. 2, the movement of the core 36 is relatively unguided; but continued upward movement of core 36 will bring seat 32 into engagement with the underside 20 of the enlarged head 18 of stem 16. At this time the core 36 will be subjected to upwardly acting, magnetically-induced forces and a downwardly acting, spring-induced force; and the conjoint effect of these spaced, oppositely-directed forces will be to provide a general alignment of the axis of the core 36 with the axis of the solenoid coil.

As the core 36 continues to move upwardly and carry the stem 16 with it, the point of application of the magnetic forces on the core will move closer and closer to the seat 32 of the core; and consequently the aligning forces on the core will decrease to very small values and may disappear altogether. However, when that happens the core will be in motion and will have sufficient inertia to continue upwardly along its initial path. Moreover, any tendency of the core to tilt will be prevented by the presence of stem 16 in bore 31.

Additional upward movement of core 36 will place that core in the position shown in Fig. 1; and at such time the surface 54 on stop 52 will cooperate with the seat 38 in the core to hold the core fixed relative to the axis of the solenoid coil. Depending on the efficacy of the initial guiding of core 36, that core may be concentric or slightly eccentric relative to the axis of the solenoid coil; but if the core is eccentric, its eccentricity will be so small that the core will oscillate but little. Consequenty the core will be quiet in its energized condition. Moreover, even if the core does tend to oscillate, the clearance between ring 42 and sleeve 44 is great enough so contact between sleeve 44 and ring 42 is unlikely; and even if contact occurs, the yielding nature of ring 42 will enable that ring to absorb and deaden any noise. As a result, centering of the core and silent operation thereof are attained; and this without resort to individual and time-consuming machining and precise aligning of the parts. Instead, simple, easily formed and assembled parts are able to provide silent, trouble-free operation.

When the coil is deenergized, the spring 72 will overcome any holding force due to residual magnetism and will move the stem and core downwardly. After the valve stem has reached the lower limit of its travel, the core 36 will continue to move down until it comes to rest upon backing plate 24.

Whereas a preferred embodiment of the present invention has been shown and described it should be apparent to those skilled in the art that various changes may be made in the form of the invention without affecting its scope.

What we claim is:

1. A solenoid that comprises an electromagnetic coil, a sleeve extending into said coil, a magnetically-responsive core, a stop adjacent one end of said sleeve to limit movement of said core through said sleeve in response to magnetic lines of force generated by said coil, an actuator carried by said core, surfaces on said actuator and said core that are selectively engageable with or separable from each other, a spring acting upon said actuator to urge said surfaces into engagement with each other whenever said core has moved through said sleeve in response to said magnetic lines of force and thereby keep said actuator from rattling against said core, and a resilient bumper on the exterior of said core that projects beyond the surface of said core, said bumper having outer dimensions substantially smaller than the inner dimensions of that part of said sleeve which is in register with said bumper whenever said core has moved through said sleeve in response to said magnetic lines of force whereby said bumper can be out of engagement with said sleeve when said core has moved through said sleeve in response to said lines of magnetic force, said spring urging said core into alignment with said sleeve, said bumper and said spring minimizing noise in said solenoid by biasing said bumper out of engagement with said sleeve and providing a yielding engagement between said bumper and said sleeve whenever said bumper and sleeve engage each other.

2. A solenoid that comprises an electromagnetic coil, a sleeve extending into said coil, a magnetically-responsive core, a stop to limit movement of said core, an actuator carried loosely by said core, a seating surface on said core intermediate the ends of said core, a seating surface on said actuator to selectively engage said seating surface on said core, a spring biasing said seating surface on said actuator into engagement with said seating surface on said core, and a bumper on the exterior of said core that projects beyond the surface of said core, said bumper having outer dimensions substantially smaller than the inner dimensions of that part of said sleeve which is in register with said bumper whenever said core is in engagement with said stop whereby said bumper can be out of engagement with said sleeve when said core engages said stop, said bumper preventing core to sleeve contact, said bumper being an annular ring and having a tapered outer face.

3. A solenoid that comprises an electromagnetic coil, a sleeve extending into said coil, a magnetically-responsive core dimensioned to fit loosely within said sleeve, a stop adjacent one end of said sleeve to limit movement of said core through said sleeve in response to magnetic lines of force generated by said coil, inter-acting surfaces on said stop and on one end of said core that center and guide said one end of said core, an actuator carried by said core, a lost-motion connection between said actuator and said core including a seating surface on said core intermediate the ends thereof and a seating surface at one end of said actuator, a spring biasing said actuator in a direction away from said one end of said core, a stationary guide for the other end of said actuator, and a resilient bumper on the exterior of said core adjacent the other end thereof that projects beyond the surface of said core but does not engage said sleeve whenever said core is aligned with said sleeve and said inter-acting surfaces on said stop and core are in engagement, said stationary guide and actuator and said spring applying guiding forces to said core as said core moves through said sleeve in response to magnetic lines of force generated by said coil, said inter-acting surfaces on said stop and core applying further guiding forces to said core as said core approaches said stop in response to magnetic lines of force generated by said coil, said core being tiltable at said seating surfaces in response to said further guiding forces, said bumper holding said other end of said core out of engagement with said sleeve and minimizing noise in the event said core does not align itself completely with said sleeve but instead places said bumper in engagement with said sleeve.

4. A solenoid as claimed in claim 3 in which the other end of said sleeve is tapered, in which said inter-acting surfaces on said stop and said core are frusto-conical, and in which said bumper is an annular ring with a tapered outer face complementary to the taper on said sleeve.

5. A solenoid that comprises an electromagnetic coil, a sleeve extending into said coil, a magnetically-responsive core dimensioned to fit loosely within said sleeve, a stop to limit movement of said core through said sleeve in response to magnetic lines of force generated by said coil, inter-acting surfaces on said stop and on one end of said core that center and guide said one end of said core, an actuator carried by said core, a lost-motion connection between said actuator and said core including a frusto-conical seating surface on said core intermediate the ends thereof and a similar seating surface at one end of said actuator, a spring biasing said actuator in a direction away from said one end of said core, and a stationary guide for the other end of said actuator, said stationary guide and said actuator and said spring applying guiding forces to said core as said core moves through said sleeve in response to magnetic lines of force generated by said coil, said inter-acting surfaces on said stop and core applying further guiding forces to said core as said core approaches said stop in response to magnetic lines of force generated by said coil, said core being tiltable at said frusto-conical seating surfaces in response to said further guiding forces.

6. A solenoid that comprises an electromagnetic coil, a sleeve extending into said coil, a magnetically-responsive core dimensioned to fit loosely within said sleeve, a stop to limit movement of said core through said sleeve in response to magnetic lines of force generated by said coil, inter-acting surfaces on said stop and on one end of said core that center and guide said one end of said core, an actuator carried by said core, a spring biasing said actuator against movement through said sleeve by the magnetic lines of force generated by said coil, a stationary guide for said actuator, and a bumper of resilient elastomeric material on the exterior of said core adjacent the other end thereof that projects beyond the surface of said core but free of said sleeve whenever said core is aligned with said sleeve, said stationary guide and said actuator and said spring applying guiding forces to said core as said core moves through said sleeve in response to magnetic lines of force generated by said coil, said inter-acting surfaces on said stop and core applying further guiding forces to said core as said core approaches said stop in response to magnetic lines of force generated by said coil, said bumper holding said other end of said core free of engagement with said sleeve and minimizing noise in the event said core fails to align itself completely within said sleeve.

7. A solenoid that comprises an electromagnetic coil, a sleeve extending into said coil, a magnetically-responsive core dimensioned to fit loosely within said sleeve, a stop to limit movement of said core through said sleeve in response to magnetic lines of force generated by said coil, interacting surfaces on said stop and on one end of said core that center and guide said one end of said core, an actuator carried by said core, a spring biasing said actuator against movement through said sleeve by the magnetic lines of force generated by said coil, and a bumper of resilient elastomeric material on the exterior of said core adjacent the other end thereof that projects beyond the surface of said core but fails to engage said sleeve whenever said core is aligned with said sleeve, said actuator and said spring applying guiding forces to said core as said core moves through said sleeves in response to magnetic lines of force generated by said coil, said inter-acting surfaces on said stop and core applying further guiding forces to said core as said core approaches said stop in response to magnetic lines of force generated by said coil, said bumper holding said other end of said core free of engagement with said sleeve and minimizing noise in the event said core fails to align itself completely within said sleeve.

8. A solenoid that comprises an electromagnetic coil, a sleeve extending into said coil, a magnetically-response core dimensioned to fit loosely within said sleeve, a stop adjacent one end of said sleeve to limit movement of said core through said sleeve in response to magnetic lines of force generated by said coil, interacting surfaces on said stop and on one end of said core that center and guide said one end of said core, an actuator carried by said core, a lost-motion connection between said actuator and said core including a seating surface on said core intermediate the ends thereof and a cooperating seating surface at one end of said actuator, a stationary guide for the other end of said actuator, and a resilient bumper on the exterior of said core adjacent the other end thereof that projects beyond the surface of said core but fails to engage said sleeve whenever said core is aligned with said sleeve and said inter-acting surface on said stop and core are in engagement, said stationary guide and said actuator applying guiding forces to said core as said core moves through said sleeve in response to magnetic lines of force generated by said coil, said inter-acting surfaces on said stop and core applying further guiding forces to said core as said core approaches said stop in response to magnetic lines of force generated by said coil, said core being tiltable at said seating surfaces in response to said further guiding forces, said bumper holding said other end of said core free of engagement with said sleeve and minimizing noise in the event said core fails to align itself completely within said sleeve.

GORDON R. ACKLIN.
MELVIN HANTACK.
H. E. PERREY.

References Cited in the file of this patent

UNITED STATES PATENTS

| Number | Name | Date |
|---|---|---|
| 959,618 | Schmidt | May 31, 1910 |
| 1,011,662 | Sundh | Dec. 12, 1911 |
| 1,389,625 | Churchward | Sept. 6, 1921 |
| 1,857,349 | Bochm | May 10, 1932 |
| 2,055,511 | Twiss | Sept. 29, 1936 |
| 2,098,195 | Ray | Nov. 2, 1937 |
| 2,098,196 | Ray | Nov. 2, 1937 |
| 2,098,197 | Ray | Nov. 2, 1937 |
| 2,114,961 | Gille | Apr. 19, 1938 |
| 2,152,300 | Bossard | Mar. 28, 1939 |
| 2,155,358 | Cyr | Apr. 18, 1939 |
| 2,223,986 | Eaton | Dec. 3, 1940 |
| 2,264,841 | Gallagher | Dec. 2, 1941 |
| 2,291,599 | Ray | Aug. 4, 1942 |
| 2,311,110 | Johnson | Feb. 16, 1943 |
| 2,324,642 | Peterson | July 20, 1943 |
| 2,343,806 | Scofield | Mar. 7, 1944 |
| 2,458,123 | Wasserlein | Jan. 4, 1949 |